INVENTOR
JAMES L. CLARK

BY

Wright & Wright

ATTORNEYS

May 7, 1963 J. L. CLARK 3,088,118
THERMOPLASTIC GAUNTLET AND ELECTRONIC WELDING METHOD
FOR UNITING THERMOPLASTIC FILM OR SHEETING
Filed Dec. 4, 1959 2 Sheets-Sheet 2
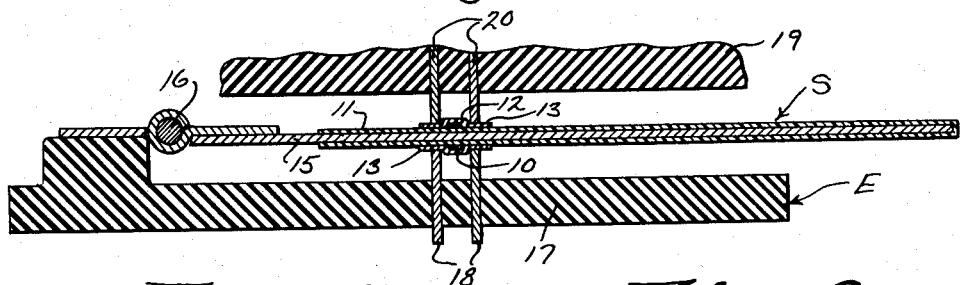
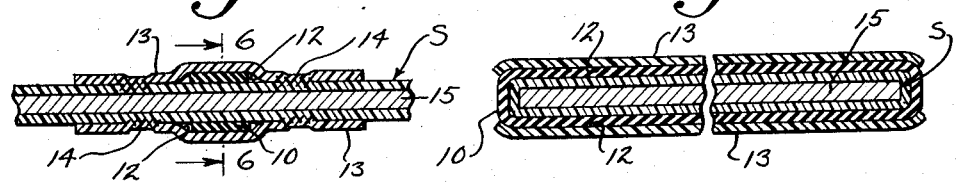 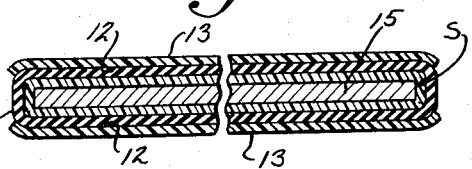
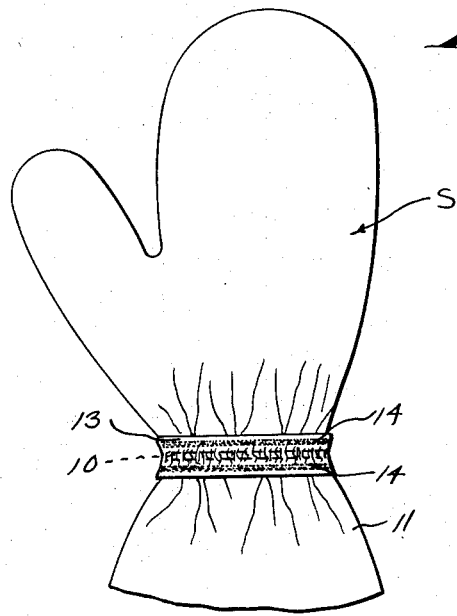
INVENTOR
JAMES L. CLARK
BY
Wright and Wright
ATTORNEYS

United States Patent Office 3,088,118
Patented May 7, 1963

3,088,118
THERMOPLASTIC GAUNTLET AND ELECTRONIC WELDING METHOD FOR UNITING THERMOPLASTIC FILM OR SHEETING
James L. Clark, Milwaukee, Wis., assignor to Mark-Clark, Inc., Milwaukee, Wis., a corporation of Wisconsin
Filed Dec. 4, 1959, Ser. No. 857,370
5 Claims. (Cl. 2—169)

This invention appertains to the making of mittens or gloves of the gauntlet type having an exterior waterproof shell or skin formed from a thermoplastic sheet or film, such as a vinyl film, and more particularly to a novel method of incorporating an elastic band at the wrist portion of the shell or skin to contract a completed gauntlet about the wrist of a wearer.

It has heretofore been proposed to associate an elastic strip at the wrist portion of a gauntlet, and much difficulty has been experienced by manufacturers in securing the strip in place.

One of the primary objects of my invention is to provide the use of an endless rubber band with means for placing the band in an exact location on the plastic film and to confine the band in place on the shell by the use of a thin strip or strips of thermoplastic film electronically welded to the shell to form a complete retaining pocket for the band, whereby to effectively prevent the weakening of the shell and waterproof quality thereof, and to reinforce the shell at the point of its greatest expansion and contraction.

Another salient object of my invention is the provision of novel means for incorporating an endless elastic band with the wrist part of a plastic shell of a mitten or glove, which consists in first slipping the shell on a floating press bed forming a part of an electronic welding machine; second, expanding a correct sized endless rubber band and slipping the same over the floating press bed and shell to the desired point; third, placing a strip of thermoplastic film over the lower die electrodes of the machine and a similar strip over the floating press bed, shell and band; fourth, bringing the upper die electrodes of the machine down into contact with the uppermost strip to electronically weld the longitudinal edges of the strip to the shell both on the top and on the bottom of the floating press bed to form an encircling pocket for the elastic band, and finally, stripping the shell with the band off of the floating press bed and allowing the band to contract to its normal condition. Thus, this method and means provides a novel technique for making two separate electronic welds simultaneously by means of an upper electrode and a lower electrode, each operating against a floating press bed located between the upper die electrode and the lower die electrode.

A further important object of my invention is to provide an outer plastic shell for a gauntlet having an endless rubber band incorporated therewith and confined thereon in a novel way.

A still further important object of my invention is the provision of means for simultaneously electronically welding thermoplastic pieces by separate upper and lower welds to the faces of sheets of thermoplastic material without the welding of the sheets themselves together.

With these and other objects in view, the invention consists in the novel construction, arrangement and formation of parts, as will be hereinafter more specifically described and claimed, and illustrated in the accompanying drawings, in which drawings, FIGURE 1 is a perspective view of the floating press bed together with the lower die or electrode used in my method and its supporting block removed from the heat or electronic welding machine;

Figure 1:
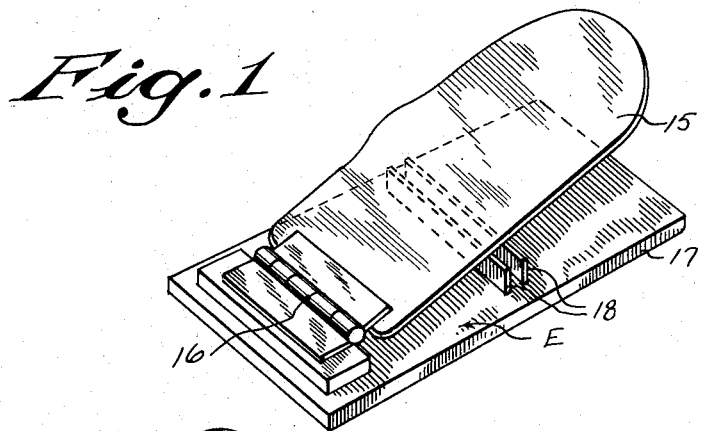

FIGURE 4 is an enlarged longitudinal sectional view through a portion of an electronic welding machine showing the upper plate thereof with the upper die electrodes in their lowered position for bringing about the sealing of the strips to the shell along the edges of the rubber band by forming two separate welds simultaneously, one from the upper die electrodes and the other from the lower die electrodes;

FIGURE 5 is an enlarged fragmentary detail longitudinal sectional view through the floating press bed showing the completion of the sealing operation;

FIGURE 6 is a transverse sectional view taken on the line 6—6 of FIGURE 5, looking in the direction of the arrows, and FIGURE 7 is a view of a completed plastic gauntlet shell stripped off of the floating press bed.

Referring to the drawings in detail, wherein similar reference characters designate corresponding parts throughout the several views, the letter S generally indicates a waterproof outer shell for a gauntlet and E a part or fixture of an electronic welding machine utilized in my novel method for incorporating an endless rubber band 10 with the wrist portion of the shell.

The shell S is fabricated from a thermoplastic material, such as vinyl film, of a desired thickness, in accordance with a practice well known in this art. The usual method of forming the shell consists in simultaneously die cutting and electronically welding like front and rear parts.

The shell is of the gauntlet type and hence includes a wrist portion 11 and the wrist portion is snugly drawn around the waist of a wearer by the rubber band 10. The shell, normally, is provided with an inner fabric liner, not shown.

As brought out in the objects of the specification, one important feature of my invention resides in the use of the endless rubber band 10 for contracting the wrist portion about the wearer and the novel method of securing the endless rubber band 10 in place, in such a manner that the wrist portion will be strengthened and reinforced.

In accordance with my method, the rubber band 10 is confined within a pocket 12 formed on the shell. The pocket 12 is made by employing strips 13 of thin thermoplastic material on the opposite faces of the shell over the rubber band. The strips 13 are then electronically welded to the shell, as at 14, adjacent to their marginal edges and each side of the rubber band 10. Obviously, the strips 13 reinforce the wrist portion 11 of the shell at a point, where greatest expansion and contraction occur.

While I have shown independent strips 13 on the opposite faces of the shell, it is to be understood, of course, that a single strip could be utilized and folded over the opposite faces of the shell.

As heretofore brought out, one of the important features of the invention is the provision of my method for incorporating the rubber band with the shell. In accordance with my method, I employ a floating press bed 15 shaped to conform to the general outline of a particular sized shell with the exception of the thumb portion thereof. This floating press bed 15 is hinged at its inner end, as at 16, to a supporting block 17. The block 17, the hinge 16 and the electronic welding machine E, and in my present adaptation, the block 17 and floating press bed 15 are removably associated with the electronic welding machine. The block 17 carries spaced transversely extending die electrodes 18 and when the floating press bed is in its lowered position, the same extends down over the electrodes. The electronic welding machine E is of a type well known in industry and includes a vertically movable upper plate 19 carrying spaced die electrodes 20, in contradistinction to the lower die electrodes 18 carried by the block 17. The upper plate 19 can be raised to a desired height to permit the block 17 to be associated with the lower base plate (not shown), of the electronic welding machine. The lower welding electrodes or die 18 and upper electrodes or die 20 are spaced apart a sufficient distance so that when the floating press bed 15 is in its lowered position with a shell S thereon, the same will lie on opposite sides of the rubber band 10 carried by the shell.

Figure 2:
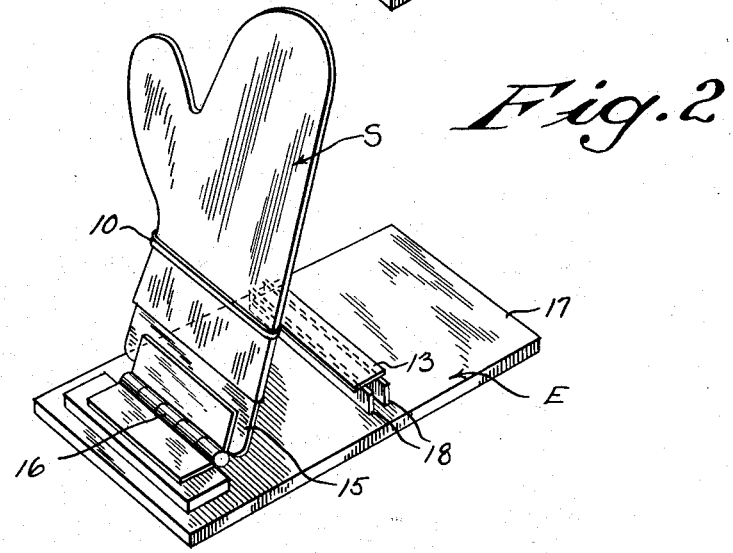
FIGURE 2 is a view similar to FIGURE 1, but showing the plastic gauntlet shell slipped over the floating press bed with an expanded rubber band placed thereon and a thermoplastic sealing strip placed over the stationary electrodes of the supporting block.
Figure 3:
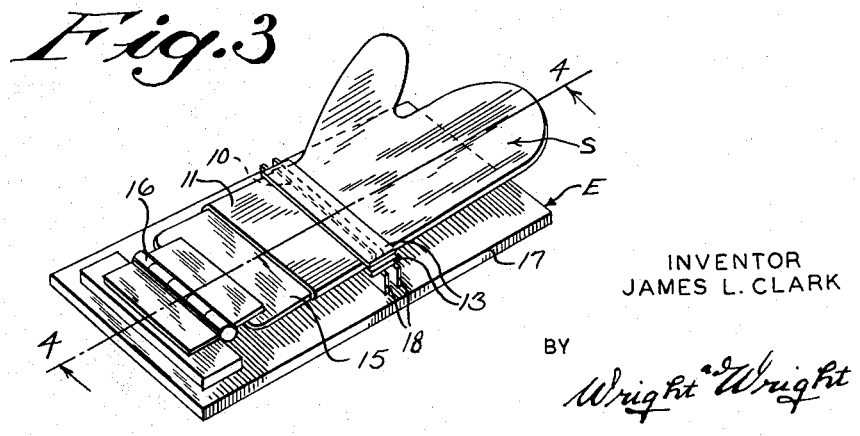
FIGURE 3 is a view similar to FIGURES 1 and 2, but showing the floating press bed in its lowered position over the stationary electrodes and strip thereon and with the outermost sealing strip placed over the rubber band.

The first step in my method consists in slipping the shell S over the floating press fed 15 and then stretching the desired size endless rubber band 10 over the floating press bed and the shell to the correct point on the wrist portion 11 of the shell, as shown in FIGURE 2 of the drawing. The second step in the method consists in placing a thermoplastic strip 13 on the lower electrodes 18, as also shown in FIGURE 2 of the drawings. The third step in my method consists in swinging the floating press bed 15 with the shell S and rubber band 10 thereon down flat against the strip 13 and laying the other strip 13 on top of the rubber band 10. This is best shown in FIGURE 3 of the drawing. The block 17 is now associated with the lower base plate of the electronic sealing machine E, after which, in accordance with the fourth step of my method, the upper plate 19 is brought forcibly down with the electrode 20 pressing against the edges of the top strip 13, and forcibly holding the edges of the lower strip 13 against the lower die electrodes 18. At this time, a high frequency electric circuit is released through the uppper and lower sealing dies 18 and 20 This brings about the simultaneous electronic welding of the upper strip 13 to the uppermost part of the shell S and the lower strip to the lower part of the shell. These two welds are accomplished with a single electrical surge without the welding of the two sides of the shell together, because of the special action of the floating press bed.

By referring to FIGURE 6, it can be seen that the strips 13 extend to the longitudinal edges of the shell S and when the shell is stripped from the floating press bed the transverse edges of the strips tend to meet, so that, actually, an endless pocket is formed for retaining the rubber band 10 in place and the rubber band is free to expand and contract in the pocket.

After the welding of the strips 13 with the shell, the upper plate 19 is again raised and the floating press bed is swung up on its hinge 16 and the shell is stripped from the floating press bed with the rubber band 10 and strips 13 thereon. The completed shell with the rubber band and strips welded in place, is shown in FIGURE 7.

Great stress is laid on the method utilized for incorporating the rubber band with the shell and also the shell itself with the rubber band combined therewith. Again, my invention permits the use of an elastic rubber band and eliminates the necessity of sewing a woven elastic strip to the shell.

To accomplish the electronic welding of the thermoplastic strips 13 to the outer faces of the gauntlet without welding the palm and back sections of the gauntlet together, it can be seen that I have employed a novel electronic welding technique which consists in the use of an upper welding die affixed to the upper plate and a lower welding die affixed to the lower base plate operating on opposite sides of a floating press bed. Thus upper and lower separate welds are formed simultaneously.

Changes in details may be made without departing from the spirit or the scope of this invention, but what I claim as new is:

1. The method of connecting an elastic band to the wrist of a waterproof outer gauntlet plastic shell, which consists in first, placing the plastic shell over a floating press bed shaped to conform to the general outline of the shell with the opposite faces of the shell separated by the floating press bed; second, stretching an endless rubber band over the floating press bed and the wrist portion of the shell; third, placing a strip of plastic above and below the wrist portion of the shell to cover the band; fourth, electronically welding the strips to the shell on each side of the longitudinal edges of the band to form a substantially continuous pocket to confine the band on the shell and then stripping the shell with band and strips from the floating press bed.

2. The method of connecting an elastic band to the wrist portion of a waterproof outer gauntlet plastic shell, which consists in first, placing the shell over a floating press bed which corresponds to the general outline of the shell with the opposite sides of the shell spaced by the floating press bed; second, stretching a rubber band and placing the band in its stretched condition over the floating press bed and the wrist portion of the shell; third, placing a thin plastic film strip over the band; fourth, electronically welding the strip to the shell on each side of the longitudinal edges of the band to confine the band on the wrist portion of the shell, and finally, stripping the shell with the band and strip thereon from the floating press bed to permit the band to contract to its normal position to form a gather at the wrist portion.

3. The method of connecting an elastic band to the wrist portion of a waterproof outer gauntlet plastic shell, consisting of first, drawing the shell over a floating press bed hingedly carried by a supporting block having a pair of spaced die electrodes at the wrist portion of the shell; second, expanding an endless elastic band over the floating press bed and shell at the wrist portion of the gauntlet; third, placing a thin plastic strip on the spaced electrodes; fourth, swinging the floating press bed down with the rubber band against the strip and between the electrodes; fifth, placing a thin plastic strip over the top of the rubber band; sixth, bringing down a pair of spaced die electrodes over the last mentioned strip on each side of the rubber band for passing a high frequency current through the first and second mentioned pairs of electrodes for electronically welding the strips to the shell on opposite sides of the longitudinal edges of the rubber band, and finally, raising the floating press bed and stripping the shell therefrom with the rubber band and strips thereon.

4. As a new article of manufacture, a waterproof plastic outer shell for gauntlets comprising a body and a wrist portion, an endless rubber band encircling the wrist portion and a pocket on the wrist portion confining the rubber band in place consisting of a plastic strip electronically welded adjacent to its longitudinal edges on each side of the rubber band to the shell, said strip functioning with a part of the shell to form the pocket for the band and to strengthen the shell at the point of connection of the band with the shell.

5. As a new article of manufacture, a waterproof outer plastic shell for gauntlets comprising a body portion and a wrist portion, an endless rubber band at the wrist portion for contracting said wrist portion and means on the wrist portion for confining the rubber band in place including thin plastic strips disposed on opposite sides of the shell and overlying the band and electronically welded to the palstic shell adjacent to their outer edges and on each side of the longitudinal edges of the band to form in conjunction with a part of the shell a continuously confining pocket for the band.

References Cited in the file of this patent

UNITED STATES PATENTS

| | | |
|---|---|---|
| 1,280,421 | Diem | Oct. 1, 1918 |
| 1,612,757 | Wells | Dec. 28, 1926 |
| 2,114,338 | Dowdall | Apr. 19, 1938 |
| 2,445,987 | Ashman | July 27, 1948 |
| 2,467,133 | Irons | Apr. 12, 1949 |
| 2,660,660 | Von Hauteville | Nov. 24, 1953 |
| 2,816,596 | Welch | Dec. 17, 1957 |
| 2,884,643 | Winson | May 5, 1959 |
| 2,905,581 | Maxey | Sept. 22, 1959 |